United States Patent
Chiera et al.

(10) Patent No.: US 11,953,281 B2
(45) Date of Patent: Apr. 9, 2024

(54) RIFLE RECEIVER ARRANGEMENT AND A METHOD OF ASSEMBLY OF A RIFLE BARREL TO SAID RIFLE RECEIVER

(71) Applicant: Lightforce Australia Pty Limited, Hindmarsh (AU)

(72) Inventors: Larry Chiera, Hindmarsh (AU); Raymond L. Dennis, Hindmarsh (AU)

(73) Assignee: Lightforce Australia Pty Limited, Hindmarsh (AU)

( * ) Notice: Subject to any disclaimer, the term of this patent is extended or adjusted under 35 U.S.C. 154(b) by 0 days.

(21) Appl. No.: 18/040,680

(22) PCT Filed: Aug. 10, 2021

(86) PCT No.: PCT/AU2021/050873
§ 371 (c)(1),
(2) Date: Feb. 6, 2023

(87) PCT Pub. No.: WO2022/032334
PCT Pub. Date: Feb. 17, 2022

(65) Prior Publication Data
US 2023/0280118 A1    Sep. 7, 2023

(30) Foreign Application Priority Data
Aug. 13, 2020   (AU) ................................ 2020902870

(51) Int. Cl.
*F41A 21/48*    (2006.01)
*F41A 3/66*     (2006.01)

(52) U.S. Cl.
CPC .............. *F41A 3/66* (2013.01); *F41A 21/485* (2013.01)

(58) Field of Classification Search
CPC ......... F41A 21/485; F41A 21/487; F41A 3/66
USPC ............................................. 42/75.01, 75.02
See application file for complete search history.

(56) References Cited

U.S. PATENT DOCUMENTS

| | | | |
|---|---|---|---|
| 10,921,081 B2 * | 2/2021 | Pichler | F41A 21/487 |
| 2005/0188591 A1 * | 9/2005 | Stone | F41A 21/485 |
| | | | 42/75.02 |
| 2013/0219765 A1 * | 8/2013 | Ibarguren | F41A 21/485 |
| | | | 42/75.02 |
| 2014/0165444 A1 | 6/2014 | Masters et al. | |
| 2017/0115094 A1 | 4/2017 | Gagnon | |

FOREIGN PATENT DOCUMENTS

| | | | | |
|---|---|---|---|---|
| DE | 1886649 | 1/1964 | | |
| DE | 202012101602 U1 * | 8/2012 | | F41A 11/04 |
| DE | 102011114686 B3 * | 3/2013 | | F41A 21/487 |
| GB | 2083159 | 3/1982 | | |
| WO | 2018201172 | 11/2018 | | |

* cited by examiner

*Primary Examiner* — Reginald S Tillman, Jr.
(74) *Attorney, Agent, or Firm* — Renner, Kenner, Greive, Bobak, Taylor & Weber

(57) ABSTRACT

A rifle receiver arrangement including a hollow chamber with a silt to receive an end of a rifle barrel. A slit opening/closing arrangement including an abutment member to abut against a rotatable bolt once the rotatable bolt is rotated in a second direction beyond a first open position such that upon abutment between the rotatable bolt and the abutment member, further rotation of the rotatable bolt in the second direction increases the gap of the slit of the hollow chamber to provide an extended open position to allow the end of the rifle barrel to be accepted less restrictively into the hollow chamber.

10 Claims, 7 Drawing Sheets

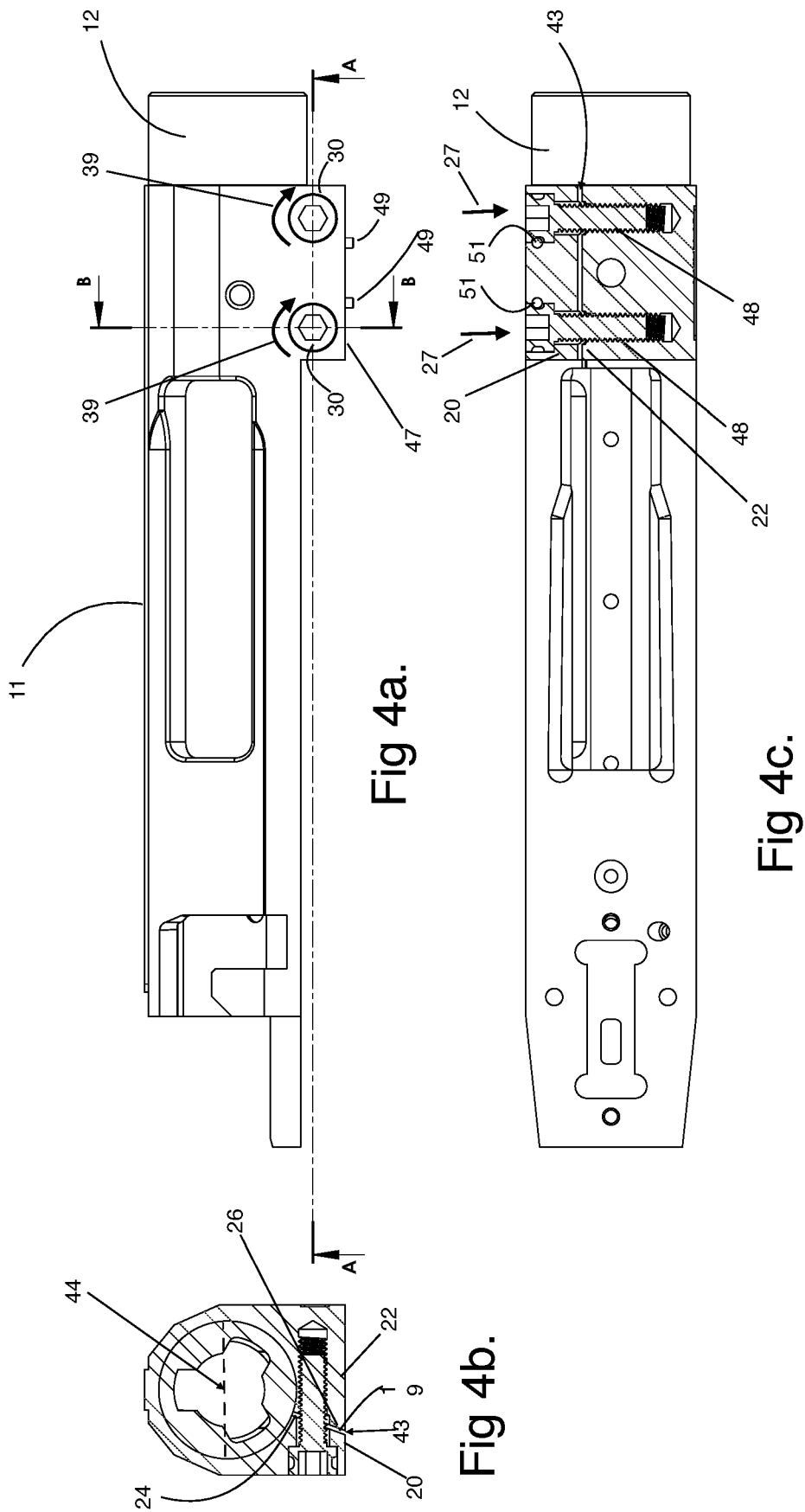

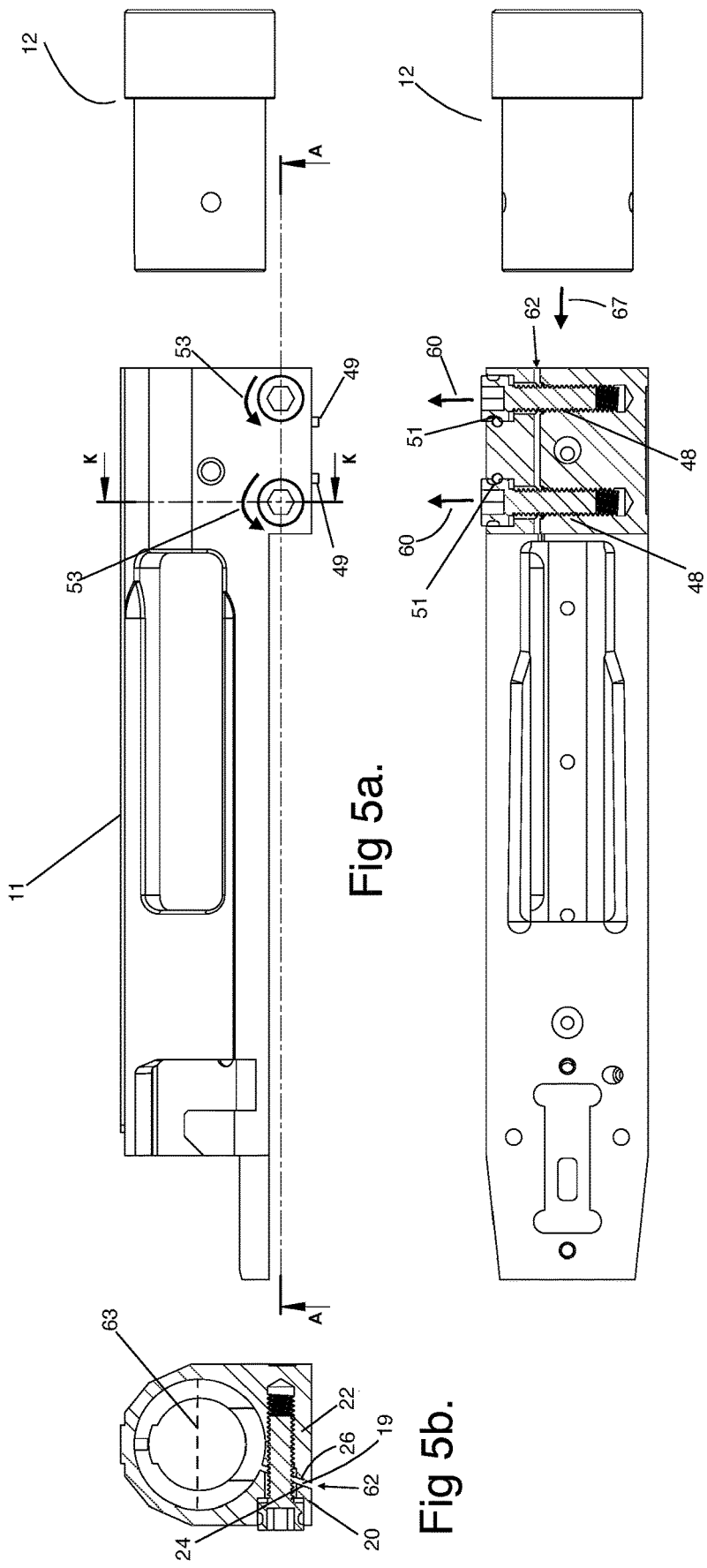

RIFLE RECEIVER ARRANGEMENT AND A METHOD OF ASSEMBLY OF A RIFLE BARREL TO SAID RIFLE RECEIVER

TECHNOLOGICAL FIELD

This invention relates to a rifle receiver and more particularly to a rifle receiver arrangement of a rifle which will allow more convenient and improved assembly of the rifle barrel to the rifle receiver.

BACKGROUND ART DISCUSSION

As introduced above, this invention presented in the following specification for the most part relates to the rifle receiver component of the rifle, sometimes referred to as the firearm frame.

While the rifle receiver of the rifle in many instances is responsible for the housing for the hammer, bolt and/or trigger mechanisms along with other componentry, the focus of this invention centres around the way in which the rifle receiver is adapted to assemble the rifle barrel to the rifle receiver with integrity and precision of use subsequently thereafter once assembled.

In some conventional arrangements the end of the rifle barrel or an intermediate piece ultimately connected to the rifle barrel is slidably receivable within a hollow chamber at one end of the rifle receiver, wherein the dimensions of the opening to the hollow chamber are defined with precision to match those dimensions at the end of the rifle barrel to allow appropriate interconnecting assembly wherein once the end of the rifle barrel is housed within the rifle receiver, this precise mating relationship between the end of the rifle barrel within that defined hollow chamber of the rifle receiver is optimum for best rifle shooting.

To allow however the ability to dissemble and reassemble the end of the rifle barrel within the rifle receiver, a slit is included along the length of the hollow chamber of the rifle receiver wherein this slit, along with inherent characteristics of the material of which the rifle receiver has been made thereof, such as the forging, machining and/or stamping of steel or aluminium, imparts a degree of resiliency around the periphery of the hollow chamber wherein the starting or resting point of the slit in an open position generally allowing the end of the rifle barrel or an intermediate piece connected to the end of the rifle barrel to be slidably received to assemble the rifle barrel with the rifle receiver.

Once the end of the rifle barrel has been slidably received into the hollow chamber, the end of the rifle barrel can then be mounted by at least partially closing the opening of the slit often introduced by way of a pair of threaded bolts that are rotated and configured into the rifle receiver so as to bring together those respective sides of the slits closing them together thereby reducing the dimensions of the hollow chamber to fixedly enclose and clamp the end of the rifle barrel within the rifle receiver.

Again, as introduced above, with modern-day rifling, rifle accuracy is paramount and this is achieved or becomes possible only by way of the precise designed dimension and lengths of interconnecting components of the rifle so that upon ultimate assembly the rifle is configured as designed to perform optimally.

Nonetheless, this precision requirement of the cut dimensions of the various componentry of the rifle can, in some instances, make it very difficult for prompt and convenient reassembling of the rifle components, particularly when outdoors and even combat situations.

For example, the diameter of the hollow chamber defined within the rifle receiver needs to almost be identically matched with the end of rifle barrel if the rife barrel is to align appropriately within the rifle receiver such that once clamped optimum accuracy of the fired rifle is to be achieved.

As introduced above, the slit as well as inherent characteristics of the material to which the rifle receiver is made from, allows a very minimal degree of resiliency or flexibility but should, for example, the end of the rifle barrel become contaminated by a small piece of dirt, debris or other particles, this may often be enough to make it very difficult then to re-insert the end of the rifle barrel into the hollow chamber of the rifle receiver.

Therefore, this means that the user would have to clean the end of the rifle barrel or confines within the hollow chamber of the rifle receiver before assembly of the end of the rifle barrel within the rifle receiver becomes possible.

While carrying out general cleaning and maintenance of the rifle may remove this inconvenience of small amounts of debris and the like from the end of the rifle barrel and/or within the confines of the hollow chamber of the rifle receiver, such delays can offer real risks and/or lost opportunity however to the user out in the field when promptness in being able to immediately assemble the rifle for discharge becomes paramount.

Accordingly, it is an object of this invention to be able to provide a rifle receiver arrangement which will be able to still utilise the restrictive design requirements of precise dimensions between the interconnecting pieces of the end of the rifle barrel within the rifle receiver but be able to accommodate the assembly of these pieces, when the situation arises, for the user to more conveniently allow the end of the rifle barrel to be received within the rifle receiver when promptness is required.

Further objects and advantages of the invention will become apparent from a complete reading of the following specification.

SUMMARY OF THE INVENTION

In one form of the invention there is provided a rifle receiver arrangement, said rifle receiver arrangement including;

a main housing unit;

said main housing unit having a first end, said first end including a block member, wherein the block member at the first end of the main housing unit includes a hollow chamber, said hollow chamber adapted to receive an end of a rifle barrel and/or an intermediate member connected with said rifle barrel;

said hollow chamber including a slit, wherein the silt includes a gap, wherein the gap provides a spacing between a first face and a second face of the block member to provide a first open position, said first open position characterised to allow the end of the rifle barrel and/or the intermediate member connected with said rifle barrel to be accepted into the hollow chamber;

a slit opening/closing arrangement, said slit opening/closing arrangement including a rotatable bolt, wherein rotation of the rotatable bolt in a first direction draws the first face and the second face of the block member towards each other reducing the spacing of the gap to provide a closed position, said closed position characterised by the end of the rifle barrel and/or the intermediate member connected with said rifle barrel to be fixed into the hollow chamber; and wherein rotation of the rotatable bolt in a second direction from the closed position returns the spacing of the gap of the silt between the first face and the second face to the first open position;

said slit opening/closing arrangement further including an abutment member, wherein said abutment is positioned in the block member of the main housing unit of the rifle receiver to abut against said rotatable bolt once said rotatable bolt is rotated in the second direction beyond the first open position;

such that upon abutment between said rotatable bolt and said abutment member, further rotation of said rotatable bolt in the second direction increases the gap of the spacing of the slit between the first face and the second face of the block member to provide an extended open position, said extended open position characterised to allow the end of the rifle barrel and/or the intermediate member connected with said rifle barrel to be accepted less restrictively into the hollow chamber.

In preference the abutment member is a dowel member.

The slit along the hollow chamber of the block member at the first end of the main housing unit provides that initial first opening position that with the inherent characteristics of the material being used with the rifle receiver imparts a degree of resiliency and if one was to use a rotatable bolt in a conventional manner that would pass through one opposing face across the slit then into and through the face on the other side of the slit and as is to be understood, as that bolt is then rotated those two opposing faces are brought together reducing that gap or opening of the slit which correspondingly reduces the dimensions of that hollow chamber to clamp the end of the rifle barrel into the rifle receiver.

This locking action from a starting first open position to the locked or closed position provided by the designed breadth dimensions of the slit of the hollow chamber for the most part is fairly standard, being able to draw together those two opposing faces over the gap to reduce the spacing of the slit thereby locking the end of the rifle barrel within the confines of the hollow chamber, but what makes this invention different and inventive is the introduction of the abutment member, preferably the dowel member and its configuration within the block member of the rifle receiver and the dowel member interaction with the rotating bolt to be able to extend the spacing of the gap of that slit which has been defined and designed for the hollow chamber of the rifle receiver a little bit further so as to expand upon the cross-sectional dimension of the hollow chamber to still allow the end of the rifle barrel to be inserted within the hollow chamber in the event that there is some contamination of the interconnecting components or even just to offer greater simplicity and convenience in being able to more promptly assemble the end of the rifle barrel within the rifle receiver much less restrictively.

In the preferred embodiment as the dowel member is also housed within the block member of the main housing unit of the rifle receiver, rotation of the bolt to release the arrangement from the closed position with rotation of the bolt beyond that initial first open position for the slit causes leveraging such that any further subsequent rotation of the rotatable bolt prompts those two opposing first and second faces of the block member about the slit of the hollow chamber to be jacked and/or extended away one with respect to the other thereby creating a bigger spacing of the gap for the slit than original designed dimensions provided for, for the gap of the slit.

In preference the abutment member is a dowel member.

In preference the slit opening/closing arrangement includes at least a pair of rotatable bolts wherein each rotatable bolt includes a corresponding dowel member.

In preference the hollow chamber is a cylindrical hollow chamber wherein said slit is longitudinally aligned along the length of the cylindrical hollow chamber.

In preference each rotatable bolt includes a bolt head, wherein the bolt head includes a slot, wherein the slot extends around the bolt head.

In preference each rotatable bolt includes a circular bolt head, wherein the circular bolt head includes a slot, wherein the slot extends circumferentially about the circular bolt head.

In preference the slot of the circular bolt head of the rotatable bolt is configured to allow a body portion of the dowel member to be therein located within said slot.

In preference the body portion of the dowel member located therein the slot of the circular bolt head is non-contacting with the sides of the slot when the rifle receiver arrangement is in the first open position.

In preference dimensions of the slot of the circular bolt head are defined to allow contact of the body portion of the dowel member with a side of the slot when the rotating bolt is rotated in the second direction beyond the first open position.

In preference the block member includes a bore hole for each rotatable bolt, wherein each bore hole defines a passage from a first side of the slit between the first face and the second face of the block member to a second side of the slit between the first face and the second face of the block member.

In preference each bore hole includes a threaded arrangement to match threads of a corresponding rotatable bolt.

In preference there is a first segment of the block member on a first side of the slit and a second segment of the block member on a second side of the slit.

In preference the receiver arrangement is made from forged, machined or stamped metal including steel or aluminium.

In order now to describe the invention in greater detail a preferred embodiment will be described with the assistance of the following illustrations and accompanying text.

BRIEF DESCRIPTION OF THE DRAWINGS

FIG. 4a is a side view of the rifle receiver arrangement shown in FIG. 1 along with the barrel extension, FIG. 4b is a section B-B of FIG. 4a and FIG. 4c is a section A-A of FIG. 4a wherein FIGS. 4a, 4b and 4c show the rifle receiver arrangement of the preferred embodiment of the invention in a closed position clamping the end of the barrel extension to the rifle receiver.

FIG. 5a is a side view of the rifle receiver arrangement shown in FIG. 1 and a barrel extension, FIG. 5b is a section K-K of FIG. 5a and FIG. 5c is a section A-A of FIG. 5a wherein FIGS. 5a, 5b and 5c show the rifle receiver arrangement of the preferred embodiment of the invention in an extended open position.

DETAILED DESCRIPTION OF THE DRAWINGS

Figure 1:
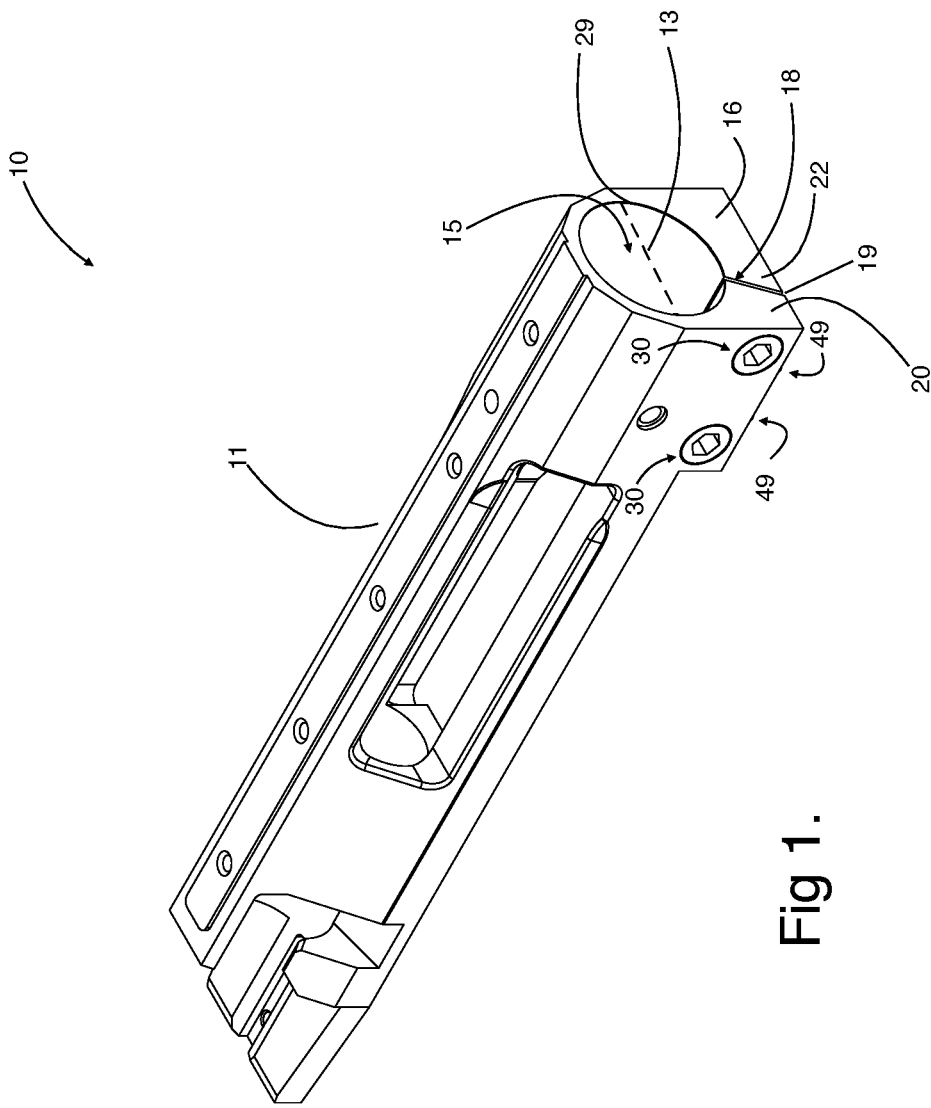
FIG. 1 is a top and side isometric view of the rifle receiver arrangement in a preferred embodiment of the invention.

FIG. 1 illustrates the rifle receiver arrangement (10) in the preferred embodiment of this invention.

Figure 2:
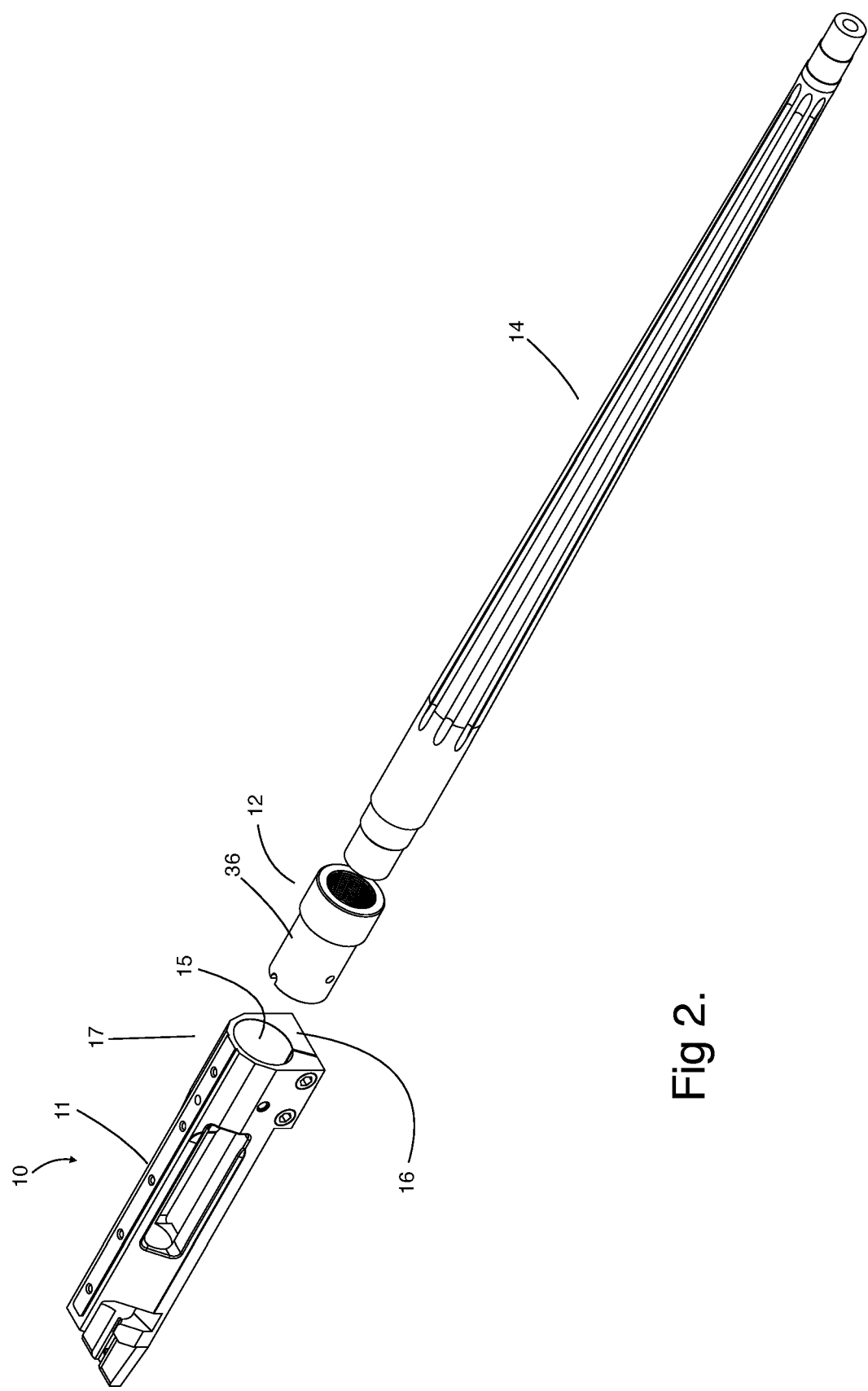
FIG. 2 is an exploded view of the rifle receiver arrangement shown in FIG. 1 with a barrel extension and fluted barrel of a rifle.
Figure 3:
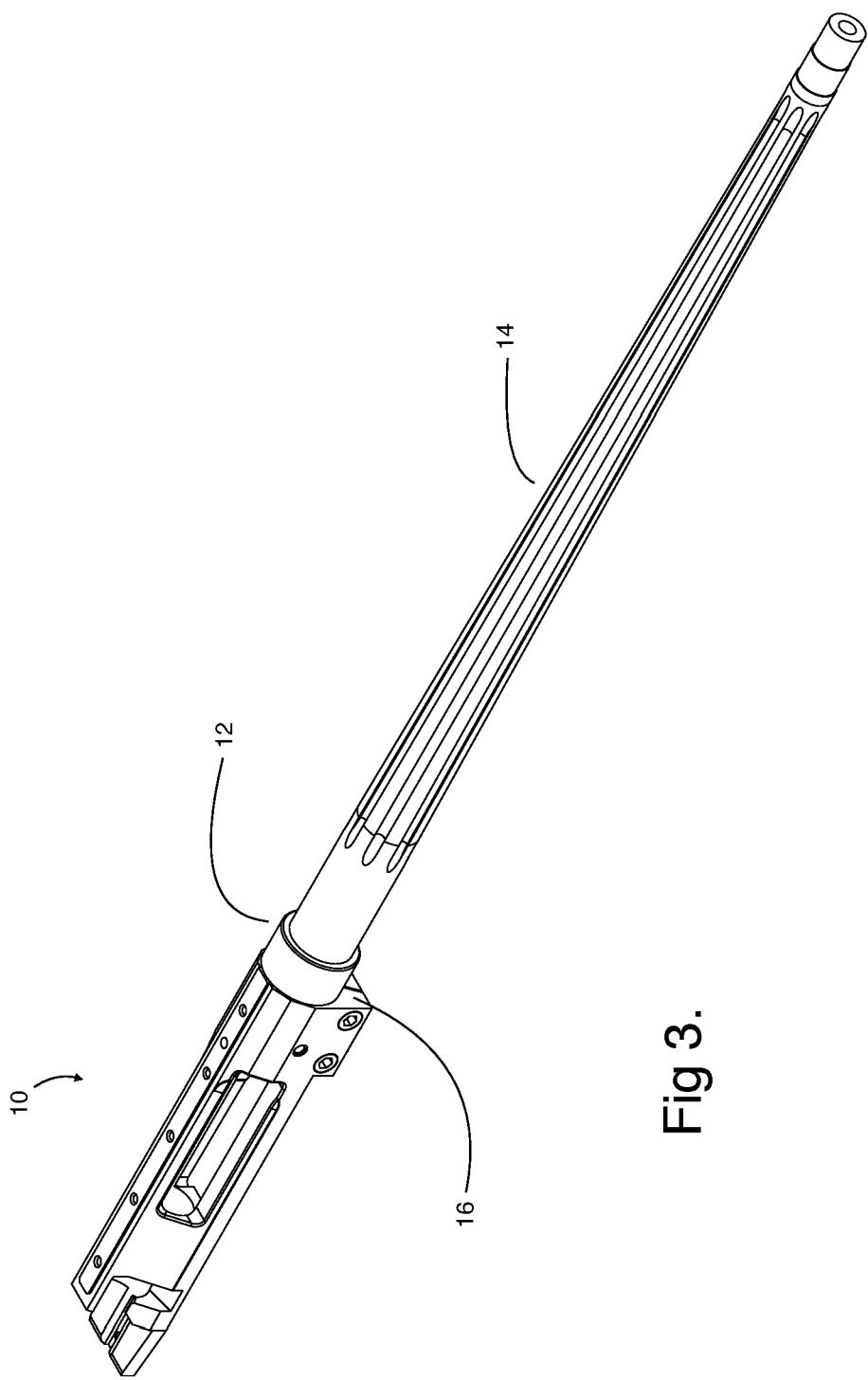
FIG. 3 is an assembled view of the rifle receiver arrangement in a preferred embodiment of this invention with the barrel extension and fluted barrel of a rifle.

To place the rifle receiver arrangement (10) in context, FIGS. 2 and 3 illustrate the rifle receiver arrangement (10) with a barrel extension (12) and a fluted barrel (14) which would form part of assembled components as shown in FIG. 3 that are then part of an overall rifle (not shown).

FIGS. 2 and 3 have the fluted barrel (14) connected to the rifle receiver arrangement (10) by way of the intermediate piece barrel extension (12).

The rifle receiver arrangement (10) main housing unit is generally referred to as (11).

This invention is all about the way in which a cylindrical hollow chamber (15) defined in a block member (16) at the first end (17) of the rifle receiver arrangement (10) engages with the end of rifle barrel whether directly or through an intermediate piece as shown in the illustrations through the sleeve (36) of the barrel extension (12).

More notably this invention is in relation to the way in which the cross-sectional diameter, shown with broken lines (13) in FIG. 1 of the cylindrical hollow chamber (15) is adjustable depending on the gap or opening (18) of the slit (19) which separates segments (20) and (22) of the block member (16) of the main housing unit (11).

Segments (20) and (22) of the block member (16) make available opposing first face (24) on segment (20) with the second face (26) of segment (22) as best seen in FIGS. 4*b* and 5*b*.

The bringing together of these respective first face (24) and second face (26) of the block member (16) segments (20) and (22) redefine the gap (18) of the slit (19) and notably the diameter shown by way of the broken lines (13) in FIG. 1 bound by the circumference edge (29) of the cylindrical hollow chamber (15).

Figure 6A:
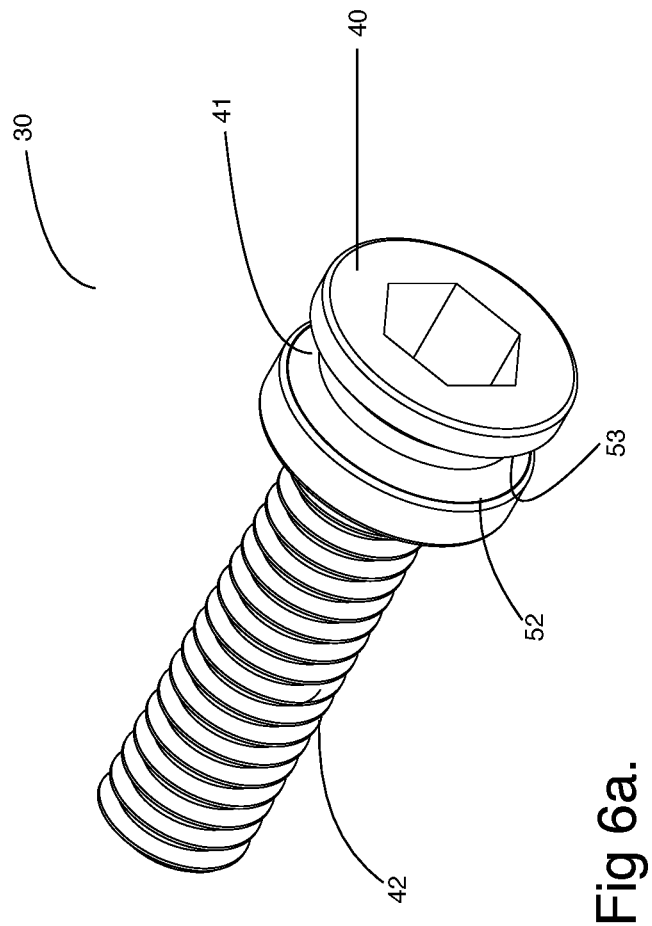
FIGS. 6*a* and 6*b* are views of the rotatable bolt in a preferred embodiment of the invention.
Figure 6B:
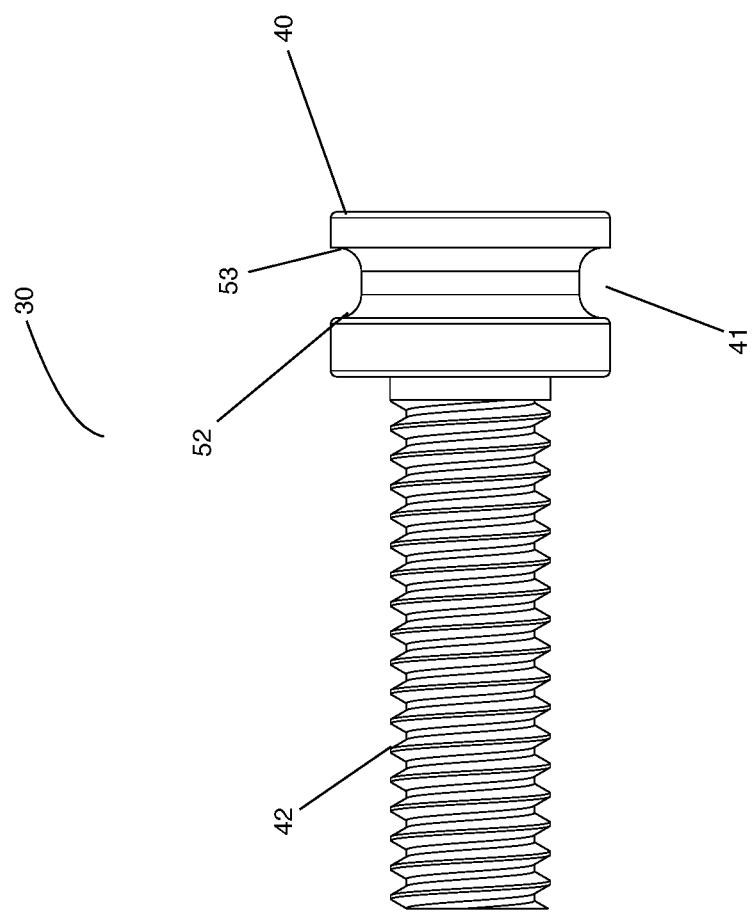

A pair of rotatable bolts shown as (30), specifically detailed in FIGS. 6*a* and 6*b* form part of the slit closing/opening arrangement for the slit (19) which is defined along the length of the cylindrical hollow chamber (15), which as discussed above has the slit (19) separated by block member (16) segments (20) and (22).

FIG. 1 may be best described as illustrating the rifle receiver arrangement (10) with the slit (19) in a first opening position or equally describable as a starting resting open position decided by the manufacturer wherein the dimensions provided for across the diameter (13) of the hollow cylindrical chamber (15) would match fairly precisely, although minutely enlarged relative to the diameter of the end of the barrel or in this instance the sleeve (36) of the barrel extension (12) as seen in FIG. 2.

The material from which the rifle receiver arrangement (10) is made, along with the gap (18) of the slit (19) provides a degree of resiliency of the block member (16) to be able to adjust the diameter (13) across the confines of the cylindrical hollow chamber (15).

Again as discussed generally the precise defined dimensions of the cylindrical hollow chamber (15) of the rifle receiver arrangement (10) matches the dimensions of the sleeve (36) of the barrel extension (12) to be slidably receivable into the confines of the hollow cylindrical chamber (15).

As best seen in FIGS. 4*a*, 4*b* and 4*c*, if the pair of rotatable bolts (30) are rotated in a first direction, commensurate with closing, clamping or locking, shown by way of arrows (39) this then moves the rotatable bolts (30), shown by way of arrows (27) so as to draw segment (20) towards segment (22) of the block member (16) wherein this drawing together of segments (20) with (22) now redefines a reduced gap (43) of the slit (19), as best seen in FIG. 4*b*, compared to the gap (18) of the slit (19), shown between the respective block member (16) segments (20) and (22) of the first starting opening position as illustrated in FIG. 1.

The broken line (44) shown in FIG. 4*b* is representative of a diameter, or at least a cross-sectional area generally across the opening of the cylindrical hollow chamber (15) wherein that diameter (44) or cross-sectional area generally across the opening of the cylindrical hollow chamber (15) shown in FIG. 4*b* would be of a slightly reduced dimension compared to the diameter or cross-sectional area represented as (13) in FIG. 1 for the cylindrical hollow chamber (15).

FIGS. 6*a* and 6*b* show in greater detail the rotatable bolt (30).

Each rotatable bolt (30) includes a circular bolt head (40), the circular bolt head (40) of the rotatable bolt (30) includes a slot (41) that extends circumferentially about the circular bolt head (40).

The rotatable bolt (30) includes a threaded shank (42), wherein as best seen in FIG. 4*c*, the threaded shank (42) of the rotatable bolt (30) is able to be received in bore holes (48) that are defined across both segments (20) and (22) of the block member (16) wherein threaded engagement with the threaded shank (42) of the rotatable bolt (30) allows relative movement between segments (20) and (22) of the block member and also as to be discussed in greater detail shortly hereafter, the coming together or the extension away of the respective faces, that being the first face (24) of segment (20) of the block member (16) and the second face (26) of the segment (22) of the block member (16).

In a conventional arrangement, as introduced previously and referrable in the context of FIGS. 4*a*, 4*b* and 4*c*, rotation of the rotatable bolts (30) in a first direction represented by way of the arrows (39) in FIG. 4*a*, allows the segments (20) and (22) to move from an opening or relaxed starting position where the slit (19) and the defined gap (18) there between the first face (24) and the second face (26) is determined by the designed dimensions configured into the block member (16) and that as explainable when reference is made to FIGS. 2 and 3 and FIGS. 4*a*, 4*b* and 4*c*, the sleeve (36) of the barrel extension (12) which is connected to the fluted barrel (14) is slidably received into the cylindrical hollow chamber (15) the barrel extension (12) can then be mounted to the main housing unit (11) of the rifle receiver arrangement (10) through the rotation of the rotating bolts (30) bringing together segments (20) and (22) of the block member (16) thus reducing the diameter (13) shown in FIG. 1 encapsulating the side (29) of the cylindrical hollow chamber (15) about the sleeve (36) of the barrel extension (12).

The significance of this invention however, more rests in the way in which segments (20) and (22) can be extended away from one another which is best understood in the context of FIGS. 5*a*, 5*b* and 5*c*. whereby notably the first face (24) of segment (20) and the second face (26) of segment (22) are moved away from one another thus providing a larger gap between the slit (19) than the one shown in FIG. 1 or FIG. 4*b*.

Importantly for this invention there is the introduction of a dowel member (49) for each rotatable bolt (30). The dowel members (49) are inserted on the underside (47) of the block member (16) so that a body portion (51) of each dowel member (49) is able to be positioned within the slot (41) of the circular bolt head (40) of the rotatable bolt (30).

In an initially resting opening position, the body portion (51) of the dowel member (49) would rest centrally within the slot (41) not making contact with shouldered ends or sides (52) and (53) of the slot (41) included as part of the circular head (40) of the rotatable bolt (30).

FIG. 5a illustrates movement of the rotatable bolts (30) in a second direction shown by way of arrows (53) to move segments (20) and (22) of the block member (16) away from each other.

As the person skilled in the art would appreciate, if the dowel member (49) was not fixed within the block member (16) and notably with the respective body portion (51) of the dowel member (49) resting within the slot (41) of the circular head (40) of the rotatable bolt (30) then continued rotation of the rotatable bolts (30) in the direction of arrows (53) would have no further effect upon the separation of segment (20) and segment (22) of the block member (16) once that designed opening position of FIG. 1 has been established. The rotatable bolts (30) without the presence of the dowel members (49) can just be rotated free of the block member (16).

The resiliency of the material from which the rifle receiver arrangement (10) is made, as well as the designed gap (18) of the slit (19) into the block member (16) once the rotatable bolt (30) are rotated in the second direction (opening), again at most will only allow the spacing or gap (18) of the slit (19) to return to a starting resting opening position.

However, as introduced in the Background Discussion of this invention, the problem is that in some instances there may be the requirement to slightly extend that opening area of the hollow cylindrical chamber (15) to more readily accommodate the barrel end of the rifle and with the introduction of the dowel member (49) and notably the body portion (51) of the dowel member (49) within the slot (41) of the circular head (40) of the rotatable bolts (30) this is now able to be achieved.

The dowel member (49) provides an abutting means, wherein as the rotatable bolts (30) as best seen in FIGS. 5a, 5b and 5c, is rotated in the second direction (53) as the rotatable bolts (30) move upwards vertically shown by way of arrows (60), this then causes the dowel member (49) to engage with the shoulder (52) of the slot (41) of the circular head (40) of the rotatable bolt (30).

The rotatable bolt (30) and the abutting engagement with the dowel member (49) means that the rotating bolts (30) cannot be, as in conventional arrangement, simply rotated free of the bore hole (48) that it has been threadedly engaged with within the block member (16).

Consequently, the dowel members (49) provide leveraging so that rotation in the second direction (opening) marked by arrow (53) will see an extended movement away from each other of the first face (24) of segment (20) and second face (26) of segment (22) as they are jacked out against each other.

This extended or jacked position, as best seen in FIG. 5b, provides a larger gap (62) of the slit (19) which is defined by the first face (24) of segment (20) and the second face (26) of segment (22) of the block member (16), thereby providing for a larger diameter referenced by way of the broken line (63) in FIG. 5b.

By being able to jack or extend open the dimensions of the cylindrical hollow chamber (15) through the use of the abutment interaction between the dowel member (49) and the rotating bolt (30) means it becomes easier for the user to reassemble the rifle barrel (14) to the rifle receiver arrangement (10).

Arrow (67) in FIGS. 5a and 5c are illustrative of the general direction that the barrel extension (12) is directed so that the sleeve (36) of the barrel extension (12) can then be received within the cylindrical hollow chamber (15).

The invention claimed is:

1. A rifle receiver arrangement, said rifle receiver arrangement including;
   a main housing unit;
   said main housing unit having a first end, said first end including a block member, wherein the block member at the first end of the main housing unit includes a hollow chamber, said hollow chamber adapted to receive an end of a rifle barrel and/or an intermediate member connected with said rifle barrel;
   said hollow chamber including a slit, wherein the silt includes a gap, wherein the gap provides a spacing between a first face and a second face of the block member to provide a first open position, said first open position characterised to allow the end of the rifle barrel and/or the intermediate member connected with said rifle barrel to be accepted into the hollow chamber;
   a slit opening/closing arrangement, said slit opening/closing arrangement including a rotatable bolt, wherein the rotatable bolt includes a circular bolt head that includes a slot that extends circumferentially about the circular bolt head, wherein rotation of the rotatable bolt in a first direction draws the first face and the second face of the block member towards each other reducing the spacing of the gap to provide a closed position, said closed position characterised by the end of the rifle barrel and/or the intermediate member connected with said rifle barrel to be fixed into the hollow chamber; and wherein rotation of the rotatable bolt in a second direction from the closed position returns the spacing of the gap of the silt between the first face and the second face to the first open position;
   said slit opening/closing arrangement further including an abutment member, wherein the abutment member is a dowel member, and a body portion of the dowel member is located and configured into the slot of the circular bolt head so as to abut against a side of the slot of the circular bolt head once said rotatable bolt is rotated in the second direction beyond the first open position;
   such that upon abutment between the body portion of the dowel member and the side of the slot of the circular bolt head, further rotation of said rotatable bolt in the second direction beyond the first open position increases the gap of the spacing of the slit between the first face and the second face of the block member to provide an extended open position, said extended open position characterised to allow the end of the rifle barrel and/or the intermediate member connected with said rifle barrel to be accepted less restrictively into the hollow chamber.

2. The rifle receiver arrangement of claim 1 wherein the slit opening/closing arrangement includes at least a pair of rotatable bolts wherein each rotatable bolt includes a corresponding dowel member.

3. The rifle receiver arrangement of claim 2 wherein the hollow chamber is a cylindrical hollow chamber wherein said slit is longitudinally aligned along the length of the cylindrical hollow chamber.

4. The rifle receiver arrangement of claim 1 wherein the body portion of the dowel member is non-contacting with the sides of the slot when the rifle receiver arrangement is in the first open position.

5. The rifle receiver arrangement of claim 4 wherein dimensions of the slot of the circular bolt head are defined to allow contact of the body portion of the dowel member with the side of the slot when the rotating bolt is rotated in the second direction beyond the first open position.

6. The rifle receiver arrangement of claim 2 wherein the block member includes a bore hole for each rotatable bolt, wherein each bore hole defines a passage from a first side of the slit between the first face and the second face of the block member to a second side of the slit between the first face and the second face of the block member.

7. The rifle receiver arrangement of claim 6 wherein each bore hole includes a threaded arrangement to match threads of a corresponding rotatable bolt.

8. The rifle receiver arrangement of claim 3 wherein the block member includes a bore hole for each rotatable bolt, wherein each bore hole defines a passage from a first side of the slit between the first face and the second face of the block member to a second side of the slit between the first face and the second face of the block member.

9. The rifle receiver arrangement of claim 4 wherein the block member includes a bore hole for each rotatable bolt, wherein each bore hole defines a passage from a first side of the slit between the first face and the second face of the block member to a second side of the slit between the first face and the second face of the block member.

10. The rifle receiver arrangement of claim 5 wherein the block member includes a bore hole for each rotatable bolt, wherein each bore hole defines a passage from a first side of the slit between the first face and the second face of the block member to a second side of the slit between the first face and the second face of the block member.

\* \* \* \* \*